United States Patent
Boothe et al.

(10) Patent No.: US 9,791,087 B2
(45) Date of Patent: Oct. 17, 2017

(54) INLINE CONNECT BREAKAWAY HOSE COUPLER

(71) Applicant: Parker-Hannifin Corporation, Cleveland, OH (US)

(72) Inventors: Brian Boothe, Nacogdoches, TX (US); Calvin Banks, Houston, TX (US)

(73) Assignee: Parker-Hannifin Corporation, Cleveland, OH (US)

(*) Notice: Subject to any disclaimer, the term of this patent is extended or adjusted under 35 U.S.C. 154(b) by 65 days.

(21) Appl. No.: 14/754,984

(22) Filed: Jun. 30, 2015

(65) Prior Publication Data

US 2015/0377402 A1   Dec. 31, 2015

Related U.S. Application Data

(60) Provisional application No. 62/018,934, filed on Jun. 30, 2014.

(51) Int. Cl.
| | |
|---|---|
| *F16L 55/10* | (2006.01) |
| *F16L 37/32* | (2006.01) |
| *F16L 37/34* | (2006.01) |

(52) U.S. Cl.
CPC ........... *F16L 55/1015* (2013.01); *F16L 37/32* (2013.01); *F16L 37/34* (2013.01)

(58) Field of Classification Search
CPC ....... F16L 55/1015; F16L 37/32; F16L 37/34; Y10T 137/87925; Y10T 137/87933; Y10T 137/87941; Y10T 137/87949; Y10T 137/87957; Y10T 137/87965

USPC ............................................. 137/614–614.05
See application file for complete search history.

(56) References Cited

U.S. PATENT DOCUMENTS

| | | | |
|---|---|---|---|
| 3,201,147 A | 8/1965 | De Cenzo | |
| 4,827,977 A | 5/1989 | Fink, Jr. | |
| 5,592,970 A * | 1/1997 | Stucchi .................. | F16L 37/34 137/614.03 |
| 5,806,564 A | 9/1998 | Wilcox | |
| 5,881,769 A | 3/1999 | Hopson | |
| 5,947,142 A | 9/1999 | Nimberger et al. | |
| 6,283,151 B1 | 9/2001 | Countryman et al. | |
| 6,938,636 B1 | 9/2005 | Nimberger | |
| 7,980,173 B2 | 7/2011 | Carmack et al. | |
| 2004/0079423 A1 * | 4/2004 | Mikiya .................. | F16L 37/34 137/614.03 |

* cited by examiner

*Primary Examiner* — Michael R Reid
(74) *Attorney, Agent, or Firm* — Renner, Otto, Boisselle & Sklar, LLP (57) ABSTRACT

A coupling including female and male couplers configured to be connected together. The female coupler includes a valve body and a detent carrier surrounding the valve body and having a plurality of circumferentially spaced openings extending through a wall of the detent carrier for receiving detents to connect the female coupler to the male coupler. When the female and male couplers are connected together, the detent carrier is axially movable relative to the valve body by externally applied loads acting on the male and female couplers to cause the male and female couplers to separate. A pressure-balancing chamber is provided to prevent premature separation of the couplers. Once separated, the detent carrier axially moves back and the female and male couplers may be reconnected.

17 Claims, 9 Drawing Sheets

INLINE CONNECT BREAKAWAY HOSE COUPLER

RELATED APPLICATION DATA

This application claims the benefit of U.S. Provisional Application No. 62/018,934, which is hereby incorporated by reference.

FIELD OF INVENTION

The present invention relates generally to couplings, and more particularly to quick connect/disconnect couplings for use with anhydrous ammonia devices.

BACKGROUND

Flow line systems which transport potentially dangerous fluids, such as anhydrous ammonia, commonly include a separable connection for emergency interruption of the flow line which extends between tanks and/or a tank and a toolbar on a transport vehicle. With a tank to tank connection, for example, if one tank is pulled away from the other prior to disconnecting the flexible flow line, the absence of a separable connection may otherwise cause a rupture of the fill line.

The monetary loss of fluid from such a rupture is nominal compared to the danger of releasing toxic vapors. The release of anhydrous ammonia may seriously injure the operator, causing blindness, skin burns, or loss of smell. For other potentially dangerous fluids, such as propane and liquid petroleum gas, the release of the fluid may cause adverse environmental consequences to the filling station site or create a fire hazard.

SUMMARY OF INVENTION

The present invention provides a breakaway coupling including female and male couplers configured to be connected together. The female coupler includes a coupler body, such as a poppet body, and detent carrier, such as a ball carrier, surrounding the coupler body and having a plurality of circumferentially spaced openings extending through a wall of the detent carrier for receiving detents, such as ball detents, to connect the female coupler to the male coupler. When the female and male couplers are connected together, the detent carrier is axially movable relative to the coupler body by externally applied loads acting on the male and female couplers to cause the male and female couplers to separate. Once separated, the detent carrier axially moves back and the female and male couplers may be reconnected.

According to one aspect of the invention a coupling is provided that includes female and male couplers configured to be connected together. The female coupler includes a valve body, such as a poppet body, having axially inner and axially outer ends and an axially extending cavity extending therebetween, a detent carrier, such as a ball carrier, surrounding the valve body and having one or more detent openings extending through a wall of the detent carrier, the detent carrier being axially movable relative to the valve body by externally applied loads acting to cause the male and female couplers to separate, a release sleeve surrounding the detent carrier at the circumferentially spaced openings and being movable between first and second positions relative to the detent carrier, one or more detents received in the one or more detent openings, each detent being held in a lock position by the release sleeve when the release sleeve is in the first position and being movable radially outwardly to an unlock position when the release sleeve is in the second position, and a valve disposed in the axially extending cavity of the valve body, the valve allowing for fluid flow through the cavity when the couplers are connected together and preventing fluid flow through the cavity when the couplers are disconnected. The male coupler includes a valve body having an axially inner end configured to be received in the female coupler, an axially outer end, and an axially extending cavity, a detent sleeve surrounding the valve body and having a detent recess on an outer surface thereof into which the detent(s) of the female coupler move(s) radially inwardly into to connect the female and male couplers, and a valve disposed in the axially extending cavity, the valve allowing for fluid flow through the cavity when the couplers are connected together and preventing fluid flow through the cavity when the couplers are disconnected.

According to another aspect of the invention, a female coupler coupleable to a male coupler is provided. The female coupler includes a valve body, such as a poppet body, having axially inner and axially outer ends and an axially extending cavity extending therebetween, a detent carrier, such as a ball carrier, surrounding the valve body and having one or more detent openings extending through a wall of the detent carrier, the detent carrier being axially movable relative to the poppet body by loads acting on the male and female couplers when the couplers are coupled together, and a valve disposed in the axially extending cavity of the valve body, the valve being biased in a first position to prevent fluid flow through the cavity when the female coupler is disconnected from the male coupler and movable to a second position to allow fluid flow through the cavity, wherein the valve body has one or more detent openings extending through a wall of the valve body through which fluid flows into a chamber defined between the valve body and the detent carrier.

According to still another aspect of the invention, a male coupler coupleable to a female coupler is provided. The male coupler includes a valve body having an axially inner end configured to be received in the female couple, an axially outer end, and an axially extending cavity, a detent sleeve surrounding the valve body and having a detent recess on an outer surface thereof into which one or more detents of the female coupler move radially inwardly into to couple the female and male couplers, a valve disposed in the axially extending cavity and secured to the valve body, and a valve sleeve surrounding the valve body and resiliently biased against the valve to prevent fluid flow through the cavity, wherein the valve sleeve is movable relative to the valve to allow/prevent fluid flow through the cavity.

According to a further aspect of the invention, a female coupler coupleable to a male coupler is provided. The female coupler includes a valve body, such as a poppet body, having axially inner and axially outer ends and an axially extending cavity extending therebetween, a detent carrier, such as a ball carrier, surrounding the valve body and having one or more detent openings extending through a wall of the detent carrier, the detent carrier being axially movable relative to the valve body by loads acting on the male and female couplers when the couplers are coupled together, a release sleeve surrounding the detent carrier at the detent opening(s) and being movable between first and second positions relative to the detent carrier, one or more detents received in the one or more detent openings, each detent being held in a lock position by the release sleeve when the release sleeve is in the first position and being movable radially outwardly when the release sleeve is in the second position, and a valve disposed in the axially extending cavity of the valve body, the valve being openable and closable to allow/prevent fluid flow through the cavity.

The foregoing and other features of the invention are hereinafter described in greater detail with reference to the accompanying drawings.

DETAILED DESCRIPTION

The principles of the present invention have particular application to inline quick connect/disconnect couplings that couple to fluid conduits connecting a first source of fluid, such as anhydrous ammonia, to a second source of fluid, and thus will be described below chiefly in this context. It will of course be appreciated, and also understood, that the principles of the invention may be useful in other fluid coupling applications where it is desirable to prevent separation of couplings due to internal pressure.

Figure 1:
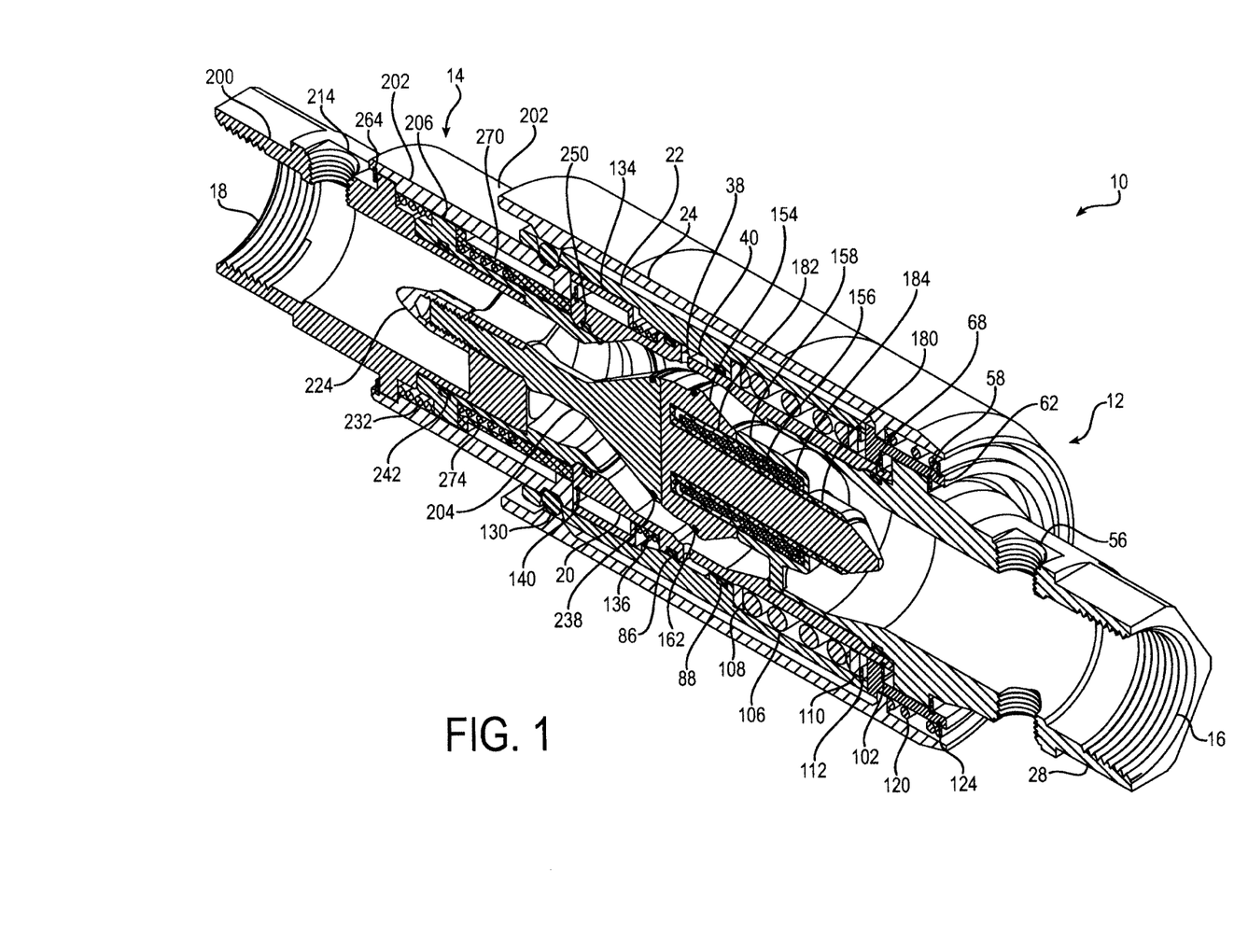
FIG. 1 is a cross-sectional elevation view of an exemplary quick connect/disconnect coupling according to the invention having a female coupler and a male coupler.

Turning now to FIG. 1, an exemplary quick connect/disconnect breakaway coupling is illustrated generally at reference numeral 10. The coupling 10 includes a female coupler 12 and a male coupler 14. The female and male couplers 12 and 14 include threaded ends 16 and 18, respectively, which may be coupled, for example, to fluid conduits, such as flexible hoses. One hose may be additionally coupled to a first nurse tank and another hose additionally coupled to a second nurse tank to allow for the carrying capacity of anhydrous ammonia to be doubled without having to provide side-by-side nurse tanks. It will be appreciated that the ends 16 and 18 may be any suitable ends for either permanently or removably coupling the female and male couplers 12 and 14 to respective components.

The female and male couplers 12 and 14 may break away from one another, as discussed in detail below, due to externally applied loads, such as when a wagon carrying one of the nurse tanks detaches from the wagon carrying the other nurse tank, without one of the couplers 12 and 14 being mounted to a bracket.

Figure 2:
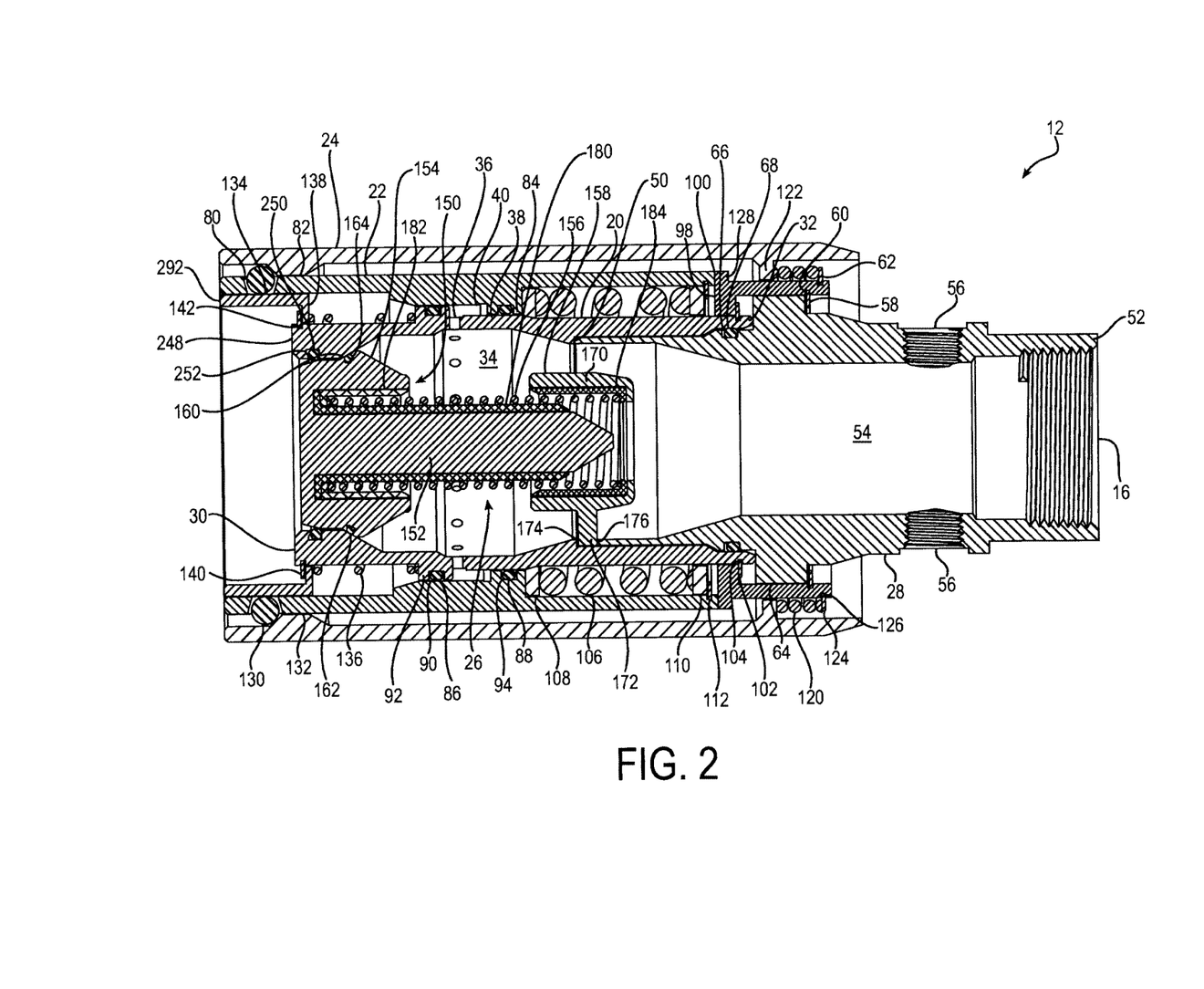
FIG. 2 is a cross-sectional view of the female coupler when disconnected from the male coupler.

Referring now to FIG. 2, the female coupler 12 includes a poppet valve body 20, a ball carrier 22, a release sleeve 24, a valve assembly 26, and a poppet connector 28. The valve body 20 has axially inner and axially outer ends 30 and 32, an axially extending cavity 34 for receiving the male coupler 14 at the axially inner end 30, and a plurality of circumferentially spaced openings 36 extending through a wall 38 of the valve body 20. The plurality of circumferentially spaced openings 36 extend through the wall 38 to allow fluid flowing through the axially extending cavity 34 to flow into a chamber 40 defined between the poppet body 20 and the ball carrier 22 to pressure balance the coupling 10. That is, fluid flows through the plurality of circumferentially spaced openings 36 in the poppet body 20 and into the chamber 40 to act against the poppet body 20 and ball carrier 22 to prevent separation of the female and male couplers 12 and 14 due to spikes in fluid pressure. The axially extending cavity 34 receives a valve of the male coupler 14 at the axially inner end 30 and receives the poppet connector 28 at the axially outer end 32. As will be appreciated, the poppet valve may be any suitable type of valve and the ball detent device may be any suitable detent device.

The poppet connector 28 includes an axially inner end 50 received in the cavity 34, an axially outer end 52 serving as the threaded end 16, an axially extending cavity 54 extending between the axially inner and outer ends 50 and 52 that fluidly communicates with the axially extending cavity 34, and one or more ports 56 for receiving a plug or a suitable valve, such as a bleed and/or pressure relief valve. The poppet connector 28 may be coupled to the poppet body 20 in any suitable manner, such as by a retainer 58, such as a retainer ring. The retainer 58 is received in a groove 60 in a ball carrier retainer 62 that surrounds the axially outer end 32 of the poppet body 20 and a ledge 64 of the poppet connector 28 that projects radially outwardly. The retainer 58 abuts a back portion of the ledge 64 to capture the ledge 64 between the axially outer end 32 of the poppet body 20 and the retainer 58. The poppet connector 28 also includes a groove 66 for a suitable seal 68, such as an o-ring, to seal the poppet connector 28 to the poppet valve body 20.

Referring now to the ball carrier 22 in detail, the ball carrier 22 surrounds the poppet body 20 and has a plurality of circumferentially spaced openings 80, such as radially inwardly tapering openings extending through a wall 82 of the ball carrier 22 and a ledge 84 projecting radially inwardly to define one side of the chamber 40. The ball carrier 22 is sealed to the poppet body 20 in any suitable manner, such as by suitable seals 86 and 88, such as o-rings. The seal 86 is disposed in a groove 90 in a ledge 92 projecting radially outwardly from the wall 38 of the poppet body 20 between the axially inner end 30 and the chamber 40, and the seal 88 is disposed in a groove 94 in the ledge 84 of the ball carrier 22 on the opposite side of the chamber 40 as the seal 86.

When the female coupler 12 is disconnected from the male coupler 14, the ball carrier 22 is prevented from moving axially towards the axially outer end 32 of the poppet body 20 by the ball carrier retainer 62, which has an end face 98 that abuts an end face 100 of the ball carrier 22. The ball carrier retainer 62 is then prevented from moving axially by the retainer 58 and a retainer 102, such as a retainer ring, which is received in a groove 104 in an outer surface of the poppet valve body 20. The ball carrier 22 is prevented from moving axially towards the axially inner end 30 by a resilient member 106, such as a spring, biasing the ball carrier 22. The resilient member 106 surrounds the poppet body 20 and is seated at a first end by a support 108 abutting an outer surface of the poppet body 20 and at a second end by a spring retainer 110 coupled to the ball carrier 22. The spring retainer 110 is coupled to the ball carrier 22 in any suitable manner, such as by a retainer 112, such as a retainer ring abutting the spring retainer 110 and being disposed in a groove 114 in an inner surface of the ball carrier 22.

Figure 5:
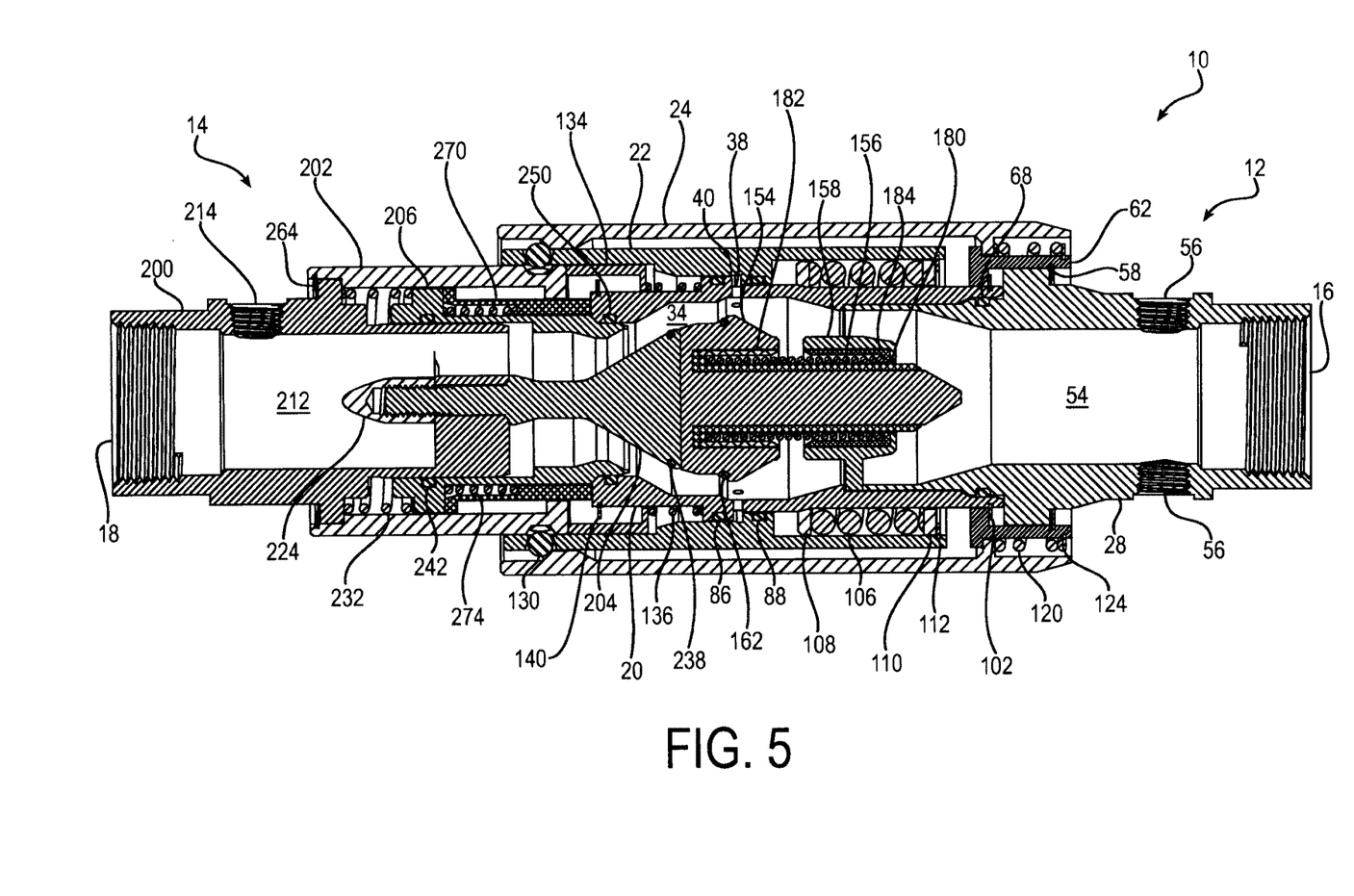
FIG. 5 is a cross-sectional view of the coupling showing the female and male couplers disconnecting due to an externally applied load acting on the couplers.

When the female and male couplers 12 and 14 are connected and when externally applied loads, such as a load on one of the hoses connected to the couplers that is greater than a force of the resilient member 106, act to cause the female and male couplers 12 and 14 to separate, the ball carrier 22 is axially movable relative to the poppet body 20 as shown in FIG. 5. As the ball carrier 22 and thus the spring retainer 110 are moved axially, the resilient member 106 is compressed until the female and male couplers 12 and 14 are disconnected. Once disconnected, the resilient member 106 moves the ball carrier 22 back to its position abutting the end face 100.

Figure 4:
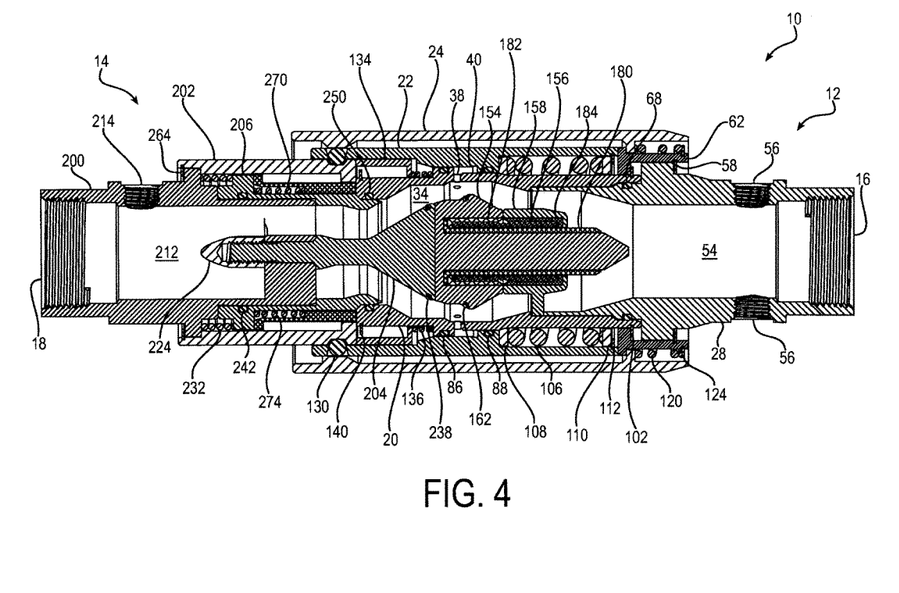
FIG. 4 is a cross-sectional view of the coupling showing the female and male couplers connected.

Referring now to the release sleeve 24 in detail, the release sleeve 24 surrounds the ball carrier 22 at the circumferentially spaced openings 80 and is movable between first and second positions relative to the ball carrier 22. The release sleeve 24 is biased in the first position shown in FIG. 4 by a resilient member 120, such as a spring, and held in a second position shown in FIG. 2 when the female and male couplers 12 and 14 are disconnected. The resilient member 120 has a first end seated on a ledge 122 of the release sleeve 24 that projects radially inwardly and a second end seated on a retainer 124, such as a retainer ring, coupled to the ball carrier retainer 62. The retainer 124 is received in a groove 126 on an outer surface of the ball carrier retainer 62. The retainer 124, resilient member 120, and ball carrier retainer 62 retain the release sleeve 24 relative to the ball carrier 22 when in the second position, and a shoulder 128 of the ball carrier retainer 62 retains the release sleeve 24 relative to the ball carrier 22 when in the first position.

The female coupler 12 additionally includes a plurality of detents 130, such as detent balls respectively received in the plurality of circumferentially spaced openings 80. When the release sleeve 24 is in the first position and the couplers are connected, a ledge 132 of the release sleeve 24 that projects radially inwardly holds the detents 130 in a lock position. The release sleeve 24 is also in the first position when an externally applied load acts to separate the female and male couplers 12 and 14 as shown in FIG. 5. During separation, the release sleeve 24 allows the detents 130 to move radially outwardly while preventing the detents from completely exiting the openings 80.

When the release sleeve 24 is in the second position, the ledge 132 is moved axially away from the openings 80, allowing the plurality of detents 130 to be moved radially outwardly to an unlock position. The detents 80 are urged radially outwardly by a detent locking ring 134 disposed interiorly of the ball carrier 22 at the plurality of circumferentially spaced openings 80. The detent locking ring 134 is resiliently biased in a first position for holding the detents 130 in the unlock position, and movable to a second position away from the plurality of circumferentially spaced openings 80 by the male coupler 14 to allow the plurality of detents 130 to be held in the lock position. The detent locking ring 134 is biased in the first position by a resilient member 136, such as a spring, that has one end seated on the ledge 92 of the poppet body 20 and another end seated on an end 138 of the detent locking ring 134. The detent locking ring 134 is held interiorly of the ball carrier 22 by a retainer 140, such as a retainer ring, that is received in a groove 142 in the outer surface of the poppet body 20.

Referring now to the valve assembly 26 in detail, the valve assembly 26 is disposed in the axially extending cavity 34 of the poppet body 20 and includes a valve 150 having a poppet stem 152 and a poppet head 154 extending radially outwardly from the stem 152, a resilient member 156, such as a spring, biasing the valve 150 in a first position shown in FIG. 2, and a guide 158 surrounding the stem 152. When the valve 150 is in the first position, the resilient member 156 biases the poppet head 154 against a valve seat 160 projecting radially inwardly from the valve body 20, thereby preventing fluid from flowing through the cavity 34. The poppet head 154 is sealed to the valve seat by a suitable seal 162, such as an o-ring, that is disposed in a groove 164 in the poppet head 154.

The guide 158 includes a hub 170 that surrounds the stem 152, where the stem 152 is movable relative to the hub 170, and a plurality of circumferentially spaced legs 172 extending radially outwardly from the hub 170 around which fluid flows from the cavity 34 to the cavity 54. The plurality of circumferentially spaced legs 172 are captured between a ledge 174 of the poppet body 20 that projects radially inwardly and the axially inner end 50 of the poppet connector 28. As shown, the poppet connector 28 includes a plurality of notches 176 in which a respective one of the legs 172 is seated.

The valve assembly 26 also includes a first poppet inner sleeve 180 surrounding the poppet stem 152, a poppet outer sleeve 182 surrounding the poppet inner sleeve 180 in a cavity between the poppet stem 152 and poppet head 154, and a second poppet inner sleeve 184 disposed in the hub 170. The first poppet inner sleeve 180, the poppet outer sleeve 182, and the second poppet inner sleeve 184 provide an electrically non-conductive barrier between resilient member 156 and the poppet head 154 to prevent galvanic corrosion. The resilient member 156 has a first end seated on the poppet outer sleeve 182 and a second end seated on the second poppet inner sleeve 184.

Figure 3:
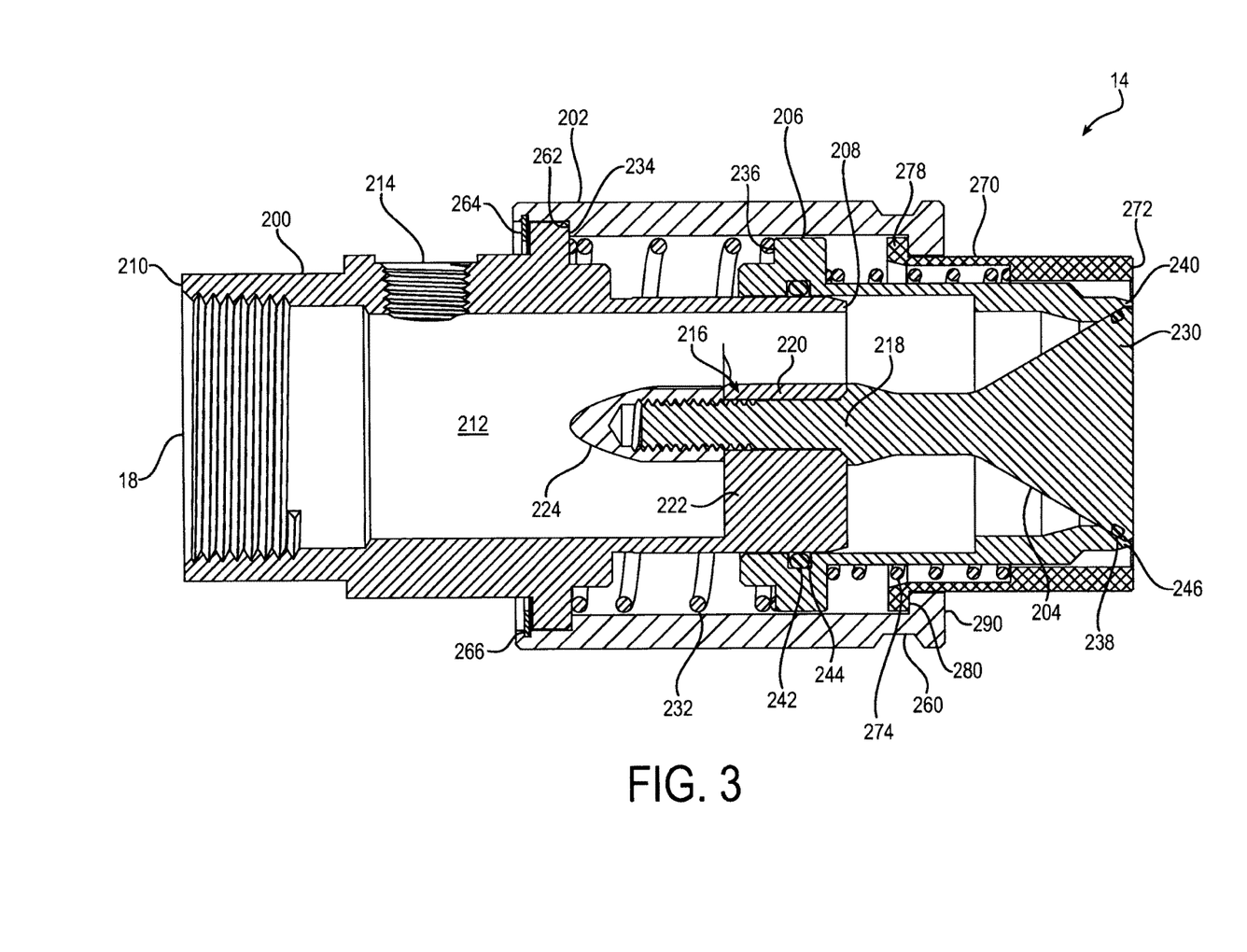
FIG. 3 is a cross-sectional view of the male coupler when disconnected from the female coupler.

Referring now to FIG. 3, the male coupler 14 includes a valve body 200, a detent sleeve 202, a valve 204, and a poppet sleeve 206. The valve body 200 has an axially inner end 208 configured to be received in the female couple 12, an axially outer end 210 serving as the threaded end 18, and an axially extending cavity 212 extending therebetween, one or more ports 214 for receiving a plug or a suitable valve, such as a bleed and/or pressure relief valve, and a guide 216. The guide 216 surrounds a stem 218 of the valve 204 and includes a hub 220 that surrounds the stem 218 and a plurality of circumferentially spaced legs 222 extending radially outwardly from the hub 220 around which fluid flowing through the cavity 212. The plurality of circumferentially spaced legs 222 are integrally formed with an inner wall of the valve body 200 at the axially inner end 208, although it will be appreciated that the legs 222 may be coupled to the valve body 200 in any suitable manner. To couple the stem 218 of the valve 204 to the guide 216, a nut 224 is coupled to the stem 216, such as by a threaded engagement.

The poppet sleeve 206 surrounds the valve body 200 and is resiliently biased against a poppet head 230 of the valve 204 to prevent fluid flow through the cavity. The poppet sleeve 206 is resiliently biased by a resilient member 232 having one end seated on a ledge 234 of the valve body 200 that projects radially outwardly and another end seated on a ledge 236 of the poppet sleeve 206 that projects radially outwardly. The poppet sleeve 206 is biased in a first position preventing fluid flow through the cavity 212 and is movable relative to the poppet head 230 to a second position allowing fluid flow through the cavity. When in the first position, the poppet sleeve 206 is sealed to the poppet head 230 by a suitable seal 238, such as an o-ring, which is disposed in a groove 240 in the poppet head 230. The poppet sleeve 206 is also sealed to the valve body 200 by a suitable seal 242, such as an o-ring, which is disposed in groove 244 in the poppet sleeve 206. When in the second position, the female and male couplers 12 and 14 are connected, and an axially inner end 246 of the poppet sleeve 206 contacts an end face 248 of a poppet body 20 at the first end 30. The poppet sleeve 206 is sealed to the poppet body 20 by a suitable seal 250, such as an o-ring, which is disposed in a groove 252 in the inner surface of the poppet body 20.

Referring now to the detent sleeve 202, the detent sleeve 202 surrounds the valve body 200 and has a detent recess 260, such as an annular channel, on an outer surface thereof into which the detents 130 of the female coupler 12 move radially inwardly into to couple the female and male couplers 12 and 14. The detent sleeve 200 includes a ledge 262 projecting radially inwardly from an inner surface thereof that abuts the ledge 234 of the valve body. A suitable retainer 264, such as a retainer ring, is disposed in a groove 266 in the inner surface of the detent sleeve 202 to capture the ledge 234 between the retainer 264 and the ledge 262, thereby securing the detent sleeve 202 to the valve body 200.

The male coupler 14 also includes a sleeve protector 270 surrounding the poppet sleeve 206. The sleeve protector 270 is biased in a first position where an end face 272 of the sleeve protector surrounds the axially inner end 246 of the poppet sleeve 206, and movable to a second position during connection of the couplers when the end face 272 of the sleeve protector 270 contacts and is moved axially by the end face 248 of the poppet body 20. The sleeve protector 270 is biased by a resilient member 274 having one end seated on the ledge 236 of the poppet sleeve 206 on a side of the ledge 236 opposite the retainer 232, and another end seated on a ledge 276 of the sleeve protector 270 that projects radially inwardly. The sleeve protector 270 includes a flanged portion 278 that contacts a ledge 280 of the detent sleeve 202 that projects radially inwardly to retain the sleeve protector 270.

During connection of the female and male couplers 12 and 14, the male coupler 14 is inserted into the female coupler 12. As the male coupler 14 advances into the female coupler 12, the end face 272 of the sleeve protector 270 contacts the end face 248 of the poppet body 20 and is moved axially towards the outer end 210 thereby compressing the resilient member 274. The poppet head 230 of the valve 204 then contacts the poppet head 154 of the valve 150 and moves the valve 204 axially from the first position preventing flow to the second position, thereby compressing the resilient member 156. The axially inner end 246 of the poppet sleeve 206 then contacts the end face 248 of the poppet body 20 and the poppet sleeve 206 is moved axially towards the outer end 210 thereby compressing the resilient member 232 and opening the flow through the axially extending cavity 212 to the axially extending cavity 34. The poppet sleeve 206 is thereby sealed to the poppet body by the seal 250.

An end face 290 of the detent sleeve 202 then contacts an end face 292 of the detent locking ring 134 to move the locking ring axially from the first position to the second position until the detent recess 260 is aligned with the openings 80. When the detent recess 260 is aligned with the openings 80, the detents 130 move axially inward into the detent recess 260, and the detents 130 do not hold the release sleeve 24 in the second position any longer. The release sleeve 24 therefore is moved to the first position shown in FIG. 4 by the resilient member 120, and the ledge 132 of the release sleeve 24 holds the detents 80 in the lock position to couple the female and male couplers 12 and 14. When the couplers 12 and 14 are connected, the fluid flows through the axially extending cavity 212 in the male coupler 14 to the axially extending cavity 34 in the female coupler 12, and then to the axially extending cavity 54 in the poppet connector 28. Some of the fluid flowing through the axially extending cavity 34 flows through the plurality of openings 36 into the chamber 40, and acts on the ledge 84 and the ledge 92 to pressure balance the couplers and prevent separation of the couplers due to fluid pressure.

When externally applied loads greater than the force of the resilient member 106 act on the female and male couplers 12 and 14, the female and male couplers 12 and 14 are pulled axially away from one another, thereby compressing the resilient member 106 as shown in FIG. 5. The loads cause the ball carrier 22 to move relative to the poppet body 20, and the movement of the ball carrier 22 causes the spring retainer 110 coupled to the ball carrier 22 to compress the resilient member 106. The ball carrier 22 is moved axially relative to the poppet body 20 and the release sleeve 24 until the openings 80 are substantially past the ledge 132 of the release sleeve 24, at which point the detents 130 move radially outwardly to the unlock position and the female and male couplers 12 and 14 are disconnected. The resilient member 106 would then move back to its uncompressed state, which would move the release sleeve 24 back to the second position. As the couplers are disconnecting, the valve 150 would move back to the first position against the poppet body 20 to prevent fluid flow through the female coupler 12, and the poppet sleeve 206 would move back to the first position against the valve 204 to prevent fluid flow through the male coupler 14.

Figure 6:
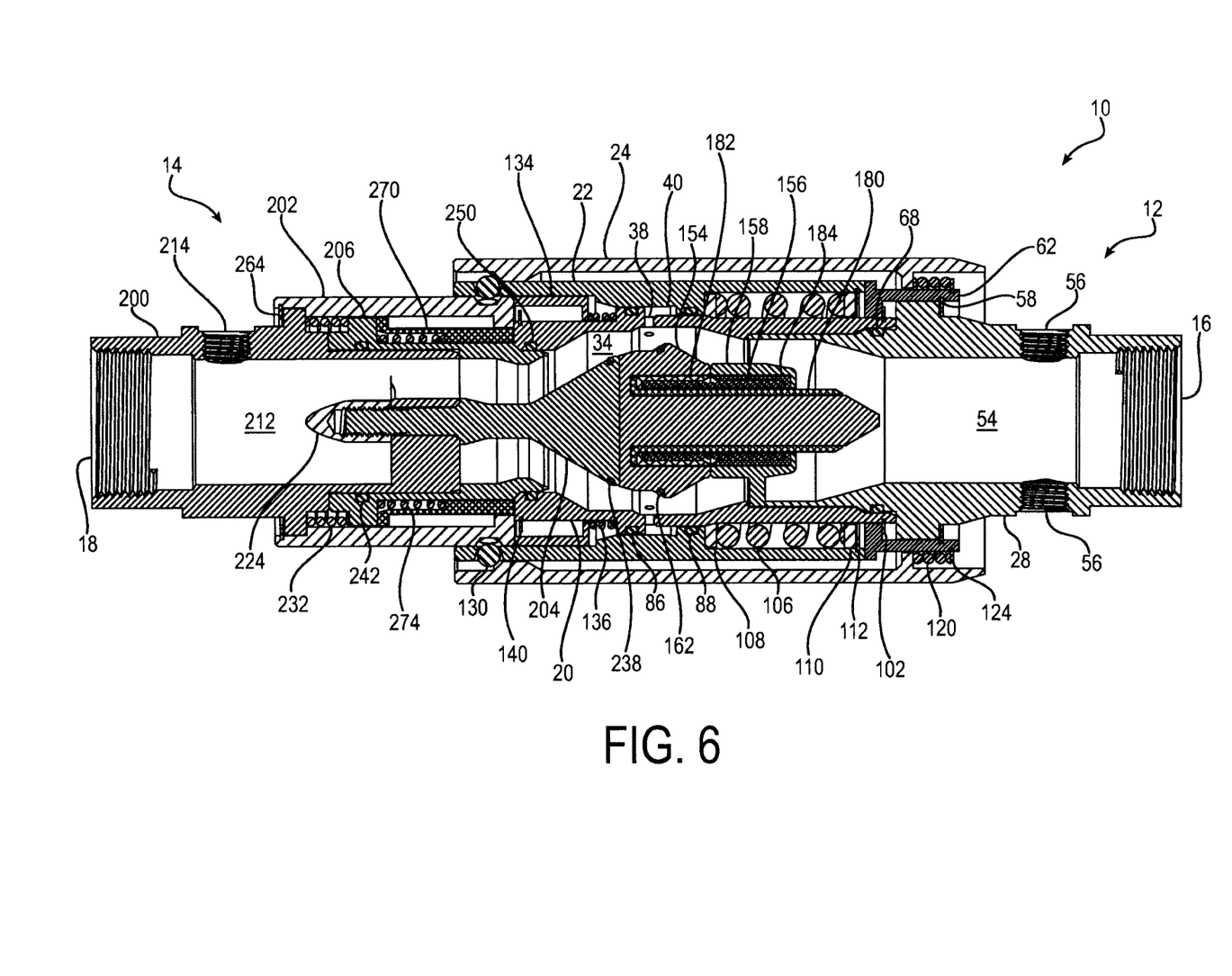
FIG. 6 is a cross-sectional view of the coupling showing the female and male couplers being manually disconnected.

Turning now to FIG. 6, the female and male couplers 12 and 14 are shown being manually disconnected. To manually disconnect the couplers, the release sleeve 24 is moved to the second position and the male coupler 14 is moved axially away from the female coupler 12. As the male coupler 14 moves, the detents 130 are urged radially outwardly by the detent recess 260. Once the detents 130 are out of the detent recess 260, the male coupler 14 may be removed from the female coupler 12, and the valves 150 and 204 close as described above.

Figure 7:
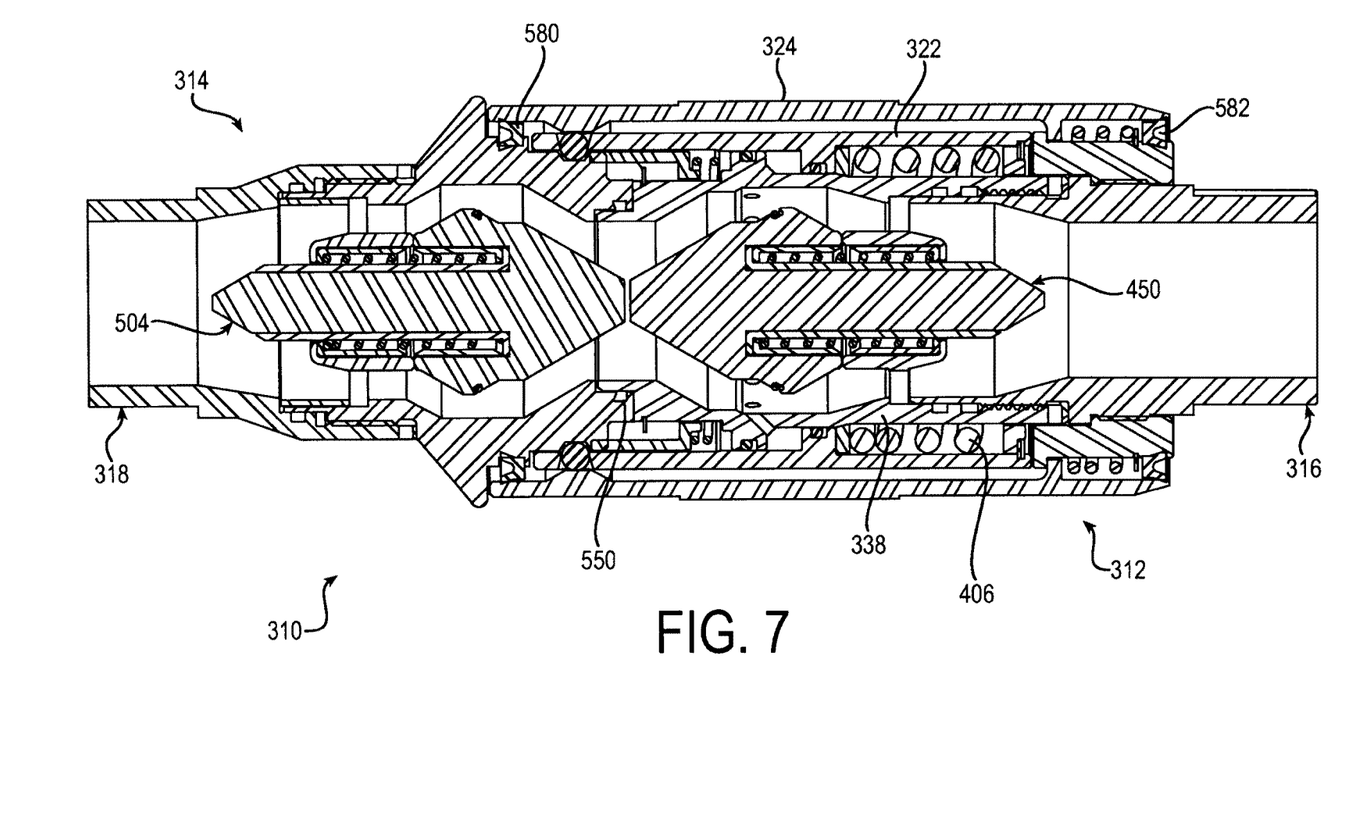
FIG. 7 is a cross-sectional view of another embodiment of a coupling according to the present invention having a female coupler and a male coupler.
Figure 8:
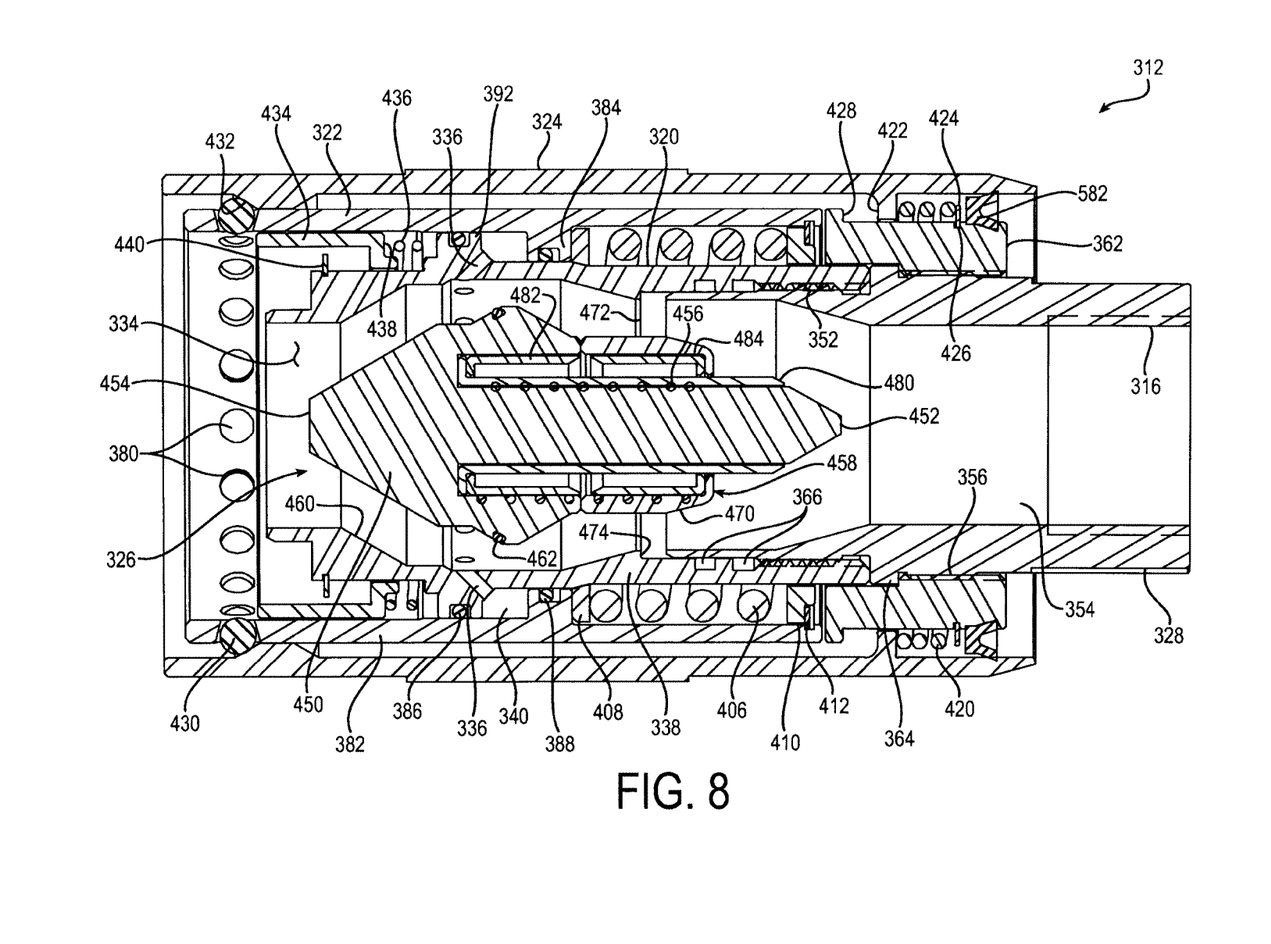
FIG. 8 is a cross-sectional view of the female coupler when disconnected from the male coupler of FIG. 7.
Figure 9:
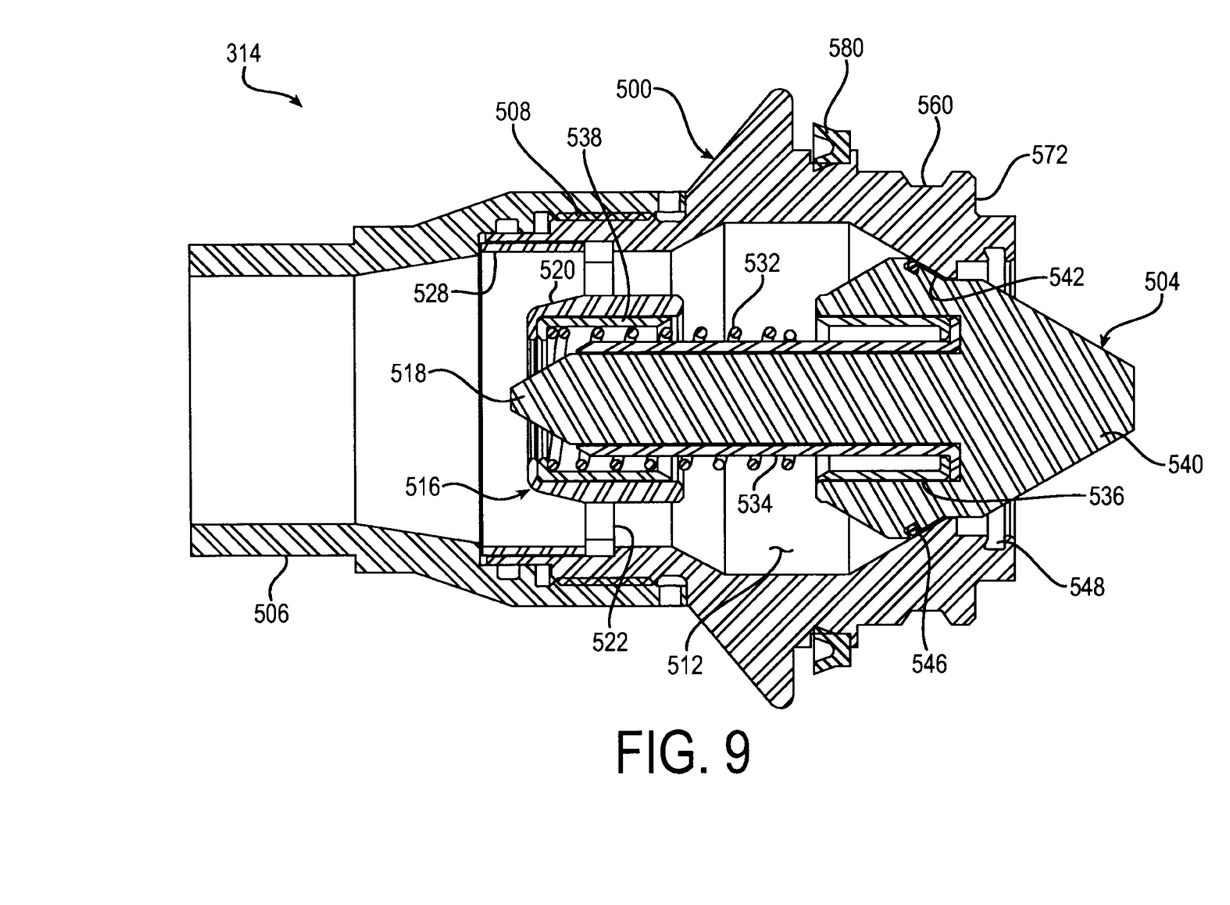
FIG. 9 is a cross-sectional view of the male coupler when disconnected from the female coupler of FIG. 7.

Referring now to FIGS. 7-9, another exemplary inline break-away coupling 310 according to the invention is shown. The coupling 310 includes a female coupler 312 and a male coupler 314. The female and male couplers 312 and 314 have axially outer ends 316 and 318, respectively, which may be coupled by suitable means, such as by threaded connections to fluid conduits, such as flexible hoses. In a particular agricultural application, one hose may be coupled to a first nurse tank carried on a first wagon and the other hose may be coupled to a second nurse tank carry on a second wagon daisy-chained to the first wagon, to allow for the carrying capacity of anhydrous ammonia to be doubled without having to provide side-by-side nurse tanks. It will be appreciated that the ends 316 and 318 may be any suitable ends for either permanently or removably coupling the female and male couplers 312 and 314 to respective components.

The female and male couplers 312 and 314 may break away from one another, as discussed in detail below, due to externally applied loads, such as when a wagon carrying one of two nurse tanks detaches from a daisy-chained wagon carrying the other nurse tank, without either one of the couplers 312 and 314 being mounted to a bracket.

Referring now to FIG. 8, the female coupler 312 includes a valve body 320, a detent carrier (e.g. ball carrier) 322, a release sleeve 324, a valve assembly 326, and a valve (e.g. poppet) connector 328. The valve body 320 has an axially extending cavity 334 for receiving the male coupler 314 at an axially inner end 330 of the valve body, and at least one and preferably a plurality of circumferentially spaced flow passages (openings) 336 extending through a wall 338 of the valve body 320. The flow passages 336 extend through the wall 338 to allow fluid flowing through the axially extending cavity 334 to flow into a chamber 340 axially defined between the valve body 320 and the detent carrier 322 to pressure balance the coupling 310. That is, fluid flows through the flow passage(s) 336 in the valve body 320 and into the chamber 340 to act against the valve body 320 and detent carrier 322 to prevent separation of the female and male couplers 312 and 314 due to spikes in fluid pressure.

The valve connector 328 has an axially inner portion 350 received in the cavity 334, an axially outer end portion that may be interiorly threaded at 316 for threaded connection to a hose fitting, and an axially extending cavity 354 extending between the axially inner and outer ends 350 and 352 of the valve connector that fluidly communicates with the axially extending cavity 334. The valve connector 328 may be coupled to the valve body 320 in any suitable manner, such as by the illustrated threaded connection 352.

A detent carrier return spring retainer 362 surrounds the axially outer end of the valve (poppet) body 320 and an annular ledge 364 of the valve (poppet) connector 328 that projects radially outwardly. The retainer 358 may abut a backside of the ledge 364 of the valve body 320. The valve connector 328 may include an annular groove or grooves 366 for a suitable annular seal or seals 368, such as an o-ring, to seal the valve connector 328 to the valve body 320.

Referring now to the detent (ball) carrier 322 in detail, the detent carrier 322 surrounds the valve body 320 and has at least one and preferably a plurality of circumferentially spaced openings 380, such as radially inwardly tapered openings extending through a wall 382 of the detent carrier 322 and a ledge 384 projecting radially inwardly to define one side of the chamber 340. The detent carrier 322 is sealed to the valve body 320 in any suitable manner, such as by suitable seals 386 and 388, such as o-rings. The seal 386 is disposed in a groove 390 in a ledge 392 that projects radially outwardly from the wall 338 of the valve body 320 and forms the axially inner end 330 of the chamber 340, and the seal 388 is disposed in a groove 394 in the ledge 384 of the detent carrier 322 on the opposite side of the chamber 340 as the seal 386.

When the female coupler 312 is disconnected from the male coupler 314, the detent carrier 322 is prevented from moving axially towards the axially outer end 332 of the valve body 320 by the detent carrier return spring retainer 362, which has an end face 98 that abuts an end face of the detent carrier 322. The detent carrier 322 is resiliently axially outwardly biased by a resilient member 406, such as a spring, biasing the detent carrier 322. The resilient member 406 surrounds the valve body 320 and is seated at a first end by a support 408 abutting a sloped outer surface of the valve body 320 and at a second end by a spring retainer 410 coupled to the detent carrier 322. The spring retainer 410 is coupled to the detent carrier 322 in any suitable manner, such as by a retainer 412 disposed in a groove in an inner surface of the detent carrier 322.

When the female and male couplers 312 and 314 are connected and when externally applied loads, such as a load on one of the hoses connected to the couplers that is greater than a force of the resilient member 406, act to cause the female and male couplers 312 and 314 to separate, the detent carrier 322 is axially movable relative to the valve body 320 as shown in FIG. 7. As the detent carrier 322 and thus the spring retainer 410 are moved axially, the resilient member 406 is compressed until the female and male couplers 312 and 314 are disconnected. Once disconnected, the resilient member 406 moves the detent carrier 322 back to its position abutting the return spring retainer 362.

Referring now to the release sleeve 324 in detail, the release sleeve 324 surrounds the detent carrier 322 at the circumferentially spaced opening(s) 380 and is movable between first and second positions relative to the detent carrier 322. The release sleeve 324 is axially inwardly biased by a resilient member 420, such as a spring, and held in a second position shown in FIG. 8 when the female and male couplers 312 and 314 are disconnected. The resilient member 420 has a first end seated on a ledge 422 of the release sleeve 324 that projects radially inwardly and a second end seated on a retainer 424, such as a retainer ring, coupled to the return spring retainer 362. The retainer 424 is received in a groove 426 on an outer surface of the return spring retainer 362. A shoulder 428 on the return spring retainer 362 serves as an axial stop for the release sleeve 324.

The female coupler 312 additionally includes a plurality of detents 430, such as detent balls respectively received in the plurality of circumferentially spaced openings 380. When the release sleeve 324 is in the first position and the couplers are connected, a ledge 432 of the release sleeve 324 that projects radially inwardly holds the detents 430 in a lock position as shown in FIG. 7. The release sleeve 324 is also in the first position when an externally applied load acts to separate the female and male couplers 312 and 314. During separation, the release sleeve 324 allows the detents 430 to move radially outwardly while preventing the detents from completely exiting the openings 380.

When the release sleeve 324 is in the second position, the ledge 432 is moved axially away from the openings 380, allowing the plurality of detents 430 to be moved radially outwardly to an unlock position. The detents 380 are urged radially outwardly by a detent locking ring 434 disposed interiorly of the detent carrier 322 at the detent opening(s) 380. The detent locking ring 434 is resiliently biased to a first position for holding the detents 430 in the unlock position, and movable to a second position against the biasing force away from the plurality of circumferentially spaced openings 380 by the male coupler 314 when inserted into the female coupler, to allow the plurality of detents 430 to be move and be held in the lock position. The detent locking ring 434 is biased in the first position by a resilient member 436, such as a spring, that has one end seated on the ledge 392 of the valve body 320 and another end seated on an end 438 of the detent locking ring 434. The detent locking ring 434 is restrained interiorly of the detent carrier 322 by a retainer 440, such as a retainer ring, that is received in a groove in the outer surface of the valve body 320.

Referring now to the valve assembly 326 in detail, the valve assembly 326 is disposed in the axially extending cavity 334 of the valve body 320 and includes a valve 450 having a valve stem 452 and a valve head 454 extending radially outwardly from the stem 452, a resilient member 456, such as a spring, axially inwardly biasing the valve 450 to a position closing the passage 334, and a guide 458 surrounding the stem 452. When the valve 450 is in the closed position, the resilient member 456 biases the valve head 454 against a valve seat 460 projecting radially inwardly from the valve body 320, thereby preventing fluid from flowing through the cavity 334. The valve head 454 is sealed to the valve seat by a suitable seal 462, such as an o-ring, that is disposed in a groove 464 in the valve head 454.

The guide 458 includes a hub 470 that surrounds the stem 452, where the stem 452 is movable relative to the hub 470, and a plurality of circumferentially spaced legs 472 extending radially outwardly from the hub 470 around which fluid flows from the cavity 334 to the cavity 354. The plurality of circumferentially spaced legs 472 are captured between a ledge 474 of the valve body 320 that projects radially inwardly and the axially inner end of the valve connector 328.

The valve assembly 326 also includes a first valve inner sleeve 480 surrounding the valve stem 452, a valve outer sleeve 482 surrounding the inner sleeve 480 in a cavity between the valve stem 452 and valve head 144, and a second inner sleeve 484 disposed in the hub 470. The first inner sleeve 480, the outer sleeve 482, and the second inner sleeve 484 provide an electrically non-conductive barrier between resilient member 456 and the valve head 454 to prevent galvanic corrosion. The resilient member 456 has a first end seated on the valve outer sleeve 482 and a second end seated on the second valve inner sleeve 484. The ends of the resilient member 456 are radially disposed and retained between the outer sleeves and the inner sleeve.

Referring now to FIG. 9, the male coupler 314 includes a valve body 500, a valve 504 and a valve connector 506. The valve body 500 has an axially inner end configured to be matingly received in the female coupler 312, and an axially extending cavity 512 extending therebetween, and a guide 516. The guide 516 surrounds a stem 518 of the valve 504 and includes a hub 520 that surrounds and guides the stem 518 for axial movement and a plurality of circumferentially spaced legs 522 extending radially outwardly from the hub 520 and around which fluid flowing through the cavity 512 can pass. The radially outer ends of the plurality of circumferentially spaced legs 522 are axially trapped between a radially outwardly extending shoulder on the valve body 500 and a tubular spacer 528 that is retained by a shoulder on the valve connector 506 that may be threaded onto the axially outer end of the valve body at threads 508.

The valve 504 is biased in a manner similar the way the valve in the female coupler is biased, there being provided a resilient member (spring) 532, an inner sleeve 534 and outer sleeves 536 and 538. The resilient member biases the head 540 of the valve axially inwardly and against a valve seat surface 542 of the valve body. The sealing surface of the valve head and the valve seat surface may be conical with corresponding cone angles, and the valve head may be provided in an annular groove with an annular sealing member 546 for effecting a good seal between the abutting valve head and seat surfaces.

The valve body 500 may also have a radially inwardly opening annular groove 548 located forwardly of the valve seat surface 542 for retaining an annular seal 550 (FIG. 7). In addition, the valve body has a radially outwardly opening detent recess 560 for receiving the detents of the female coupler when the couplers are mated.

When the male coupler is inserted into the female coupler, an axial end face 572 of the male coupler body will engage an axial end face of the detent locking ring 434 and cause the detent locking ring to retract into the female coupler so as to expose the detents 430. The detents will pass over the valve body of the male coupler until aligned with the detent groove 560 at which point the detents can move radially inwardly and axially engage within the detent groove. Upon radial movement of the detents into the detent groove, the release sleeve 324 will be free to move axially outwardly under the biasing force of the return spring 420. This will cause the radially inwardly protruding ledge 432, which could also be considered a land, to move over the detents and prevent them from moving radially of the detent groove, thereby locking the male and female couplers together.

While the male coupler is being inserted into the female coupler, the proximal ends of the valve heads thereof will engage one another and cause the valve heads to unseat from the respective valve seats, thereby to establish fluid communication between the valve passage 334 of the female coupler and the valve passage 512 in the male coupler, so that fluid can flow through the coupling. If desired, wiper seals 580 and 582 may be provided as shown to reduce contaminants from entering the coupling after the couplers have been mated.

Once coupled, the couplers can be separated by manually moving the release sleeve 324 axially away from the mail coupler to shift the detent retention land 432 away from the detents to allow the detents to move radially outwardly and disengage from the detent groove. As the couplers move apart, the detent locking ring 434 will move underneath the detents and hold the detents such that they protrude radially outwardly from the detent carrier. Also, upon releasing the release sleeve, the release sleeve will be moved toward and into engagement with the protruding detents, as shown in FIG. 8.

The couplers can also separate if an axial separation force acting on the male and female couplers exceeds a prescribed amount. When an axial separation force is applied to the coupling, the force will try to pull the male coupler out of the female coupler. When the preload force of the resilient member 406 is exceeded, a further increase in force will cause the detent carrier 322 to be move axially outwardly (to the left in FIG. 7) against the biasing force of the resilient member 406. When the detent carrier has moved to a point that the detents are free of the land 432, the detents can move radially outwardly and disengage from the detent groove, thereby allowing separation of the couplers.

The pull-apart force needed to separate the couplers is primarily dictated by the resilient member 406. Moreover, the pull-apart force will be independent of the pressure of fluid in the couplers. This is the result of the pressure equalization/compensation chamber 340. If this chamber was not in communication with the fluid pressure in the couplers, the fluid pressure would add to the force acting to axially outwardly shift the detent carrier against the biasing force of the resilient member 406. Hence, high fluid pressure in the coupling could cause the couplers to separate at a pressure less than prescribed. The use of the chamber 340 counterbalances fluid pressure forces otherwise acting to overcome the biasing force of the resilient member. Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling including female and male couplers configured to be connected together,
   the female coupler including:
   a female coupler valve body having axially inner and axially outer ends and an axially extending cavity extending therebetween;
   a detent carrier surrounding the female coupler valve body and having at least one detent opening extending through a wall of the detent carrier, the detent carrier being axially movable relative to the female coupler valve body by externally applied loads acting to cause the male and female couplers to separate;
   a release sleeve surrounding the detent carrier at the at least one detent opening and being movable between first and second positions relative to the detent carrier;
   at least one detent received in the at least one detent opening, each detent being held in a lock position by the release sleeve when the release sleeve is in the first position and being movable radially outwardly to an unlock position when the release sleeve is in the second position; and
   a female coupler valve disposed in the axially extending cavity of the female coupler valve body, the valve allowing for fluid flow through the cavity when the couplers are connected together and preventing fluid flow through the cavity when the couplers are disconnected; and
   the male coupler including:
   a male coupler valve body having an axially inner end configured to be received in the female coupler, an axially outer end, and an axially extending cavity;
   a detent recess on an outer surface of the male coupler valve body or a detent sleeve surrounding the male coupler valve body into which the at least one detent of the female coupler moves radially inwardly into to connect the female and male couplers; and
   a male coupler valve disposed in the axially extending cavity, the valve allowing for fluid flow through the cavity when the couplers are connected together and preventing fluid flow through the cavity when the couplers are disconnected; and
   wherein the female coupler valve body has at least one flow passage extending through a wall of the female coupler valve body through which fluid flows into a chamber axially defined between the female coupler valve body and the detent carrier, whereby fluid flows through the at least one flow passage in the female coupler valve body into the chamber to act against the female coupler valve body and detent carrier to resist separation of the male and female couplers.

2. The coupling according to claim 1, wherein the female coupler further includes a resilient member biasing the release sleeve in the first position, wherein the resilient member has a first end seated on a ledge of the release sleeve that projects radially inwardly and a second end seated on a retainer coupled to a carrier retainer.

3. The coupling according to claim 1, further including a seal that seals the female coupler valve body to the detent carrier between the axially inner end of the female coupler valve body and the chamber, and a seal that seals the female coupler valve body to the detent carrier between the axially outer end of the female coupler valve body and the chamber.

4. The coupling according to claim 1, wherein the female coupler valve is biased in a first position to prevent fluid flow through the cavity of the female coupler valve body when the couplers are disconnected and is movable to a second position to allow fluid flow through the cavity of the female coupler.

5. The coupling according to claim 4, further including a seal that seals the female coupler valve to the female coupler valve body when the female coupler valve is in the first position, and wherein the female coupler further includes a seal disposed in a groove in an inner surface of the female coupler valve body configured to seal the female coupler valve body to a valve sleeve of the male coupler when the couplers are connected.

6. The coupling according to claim 1, wherein the female coupler further includes a female valve connector coupled to the female coupler valve body and configured to be coupled to a fluid conduit, and wherein the female valve connector has an axially extending cavity fluidly communicating with the axially extending cavity of the female coupler valve body, and further including a seal that seals the female valve connector to the female coupler valve body at the axially outer end.

7. The coupling according to claim 1, wherein the female coupler further includes a guide disposed in the axially extending cavity of the female coupler valve body and surrounding a stem of the female coupler valve, wherein the guide includes a hub that surrounds the stem and a plurality of circumferentially spaced legs extending radially outwardly from the hub, and wherein fluid flowing through the cavity flows around the legs, wherein the plurality of circumferentially spaced legs are captured between a ledge projecting inwardly from an inner surface of the female coupler valve body and an end face of a female valve connector, and further including a resilient member biasing the female coupler valve in a first position, wherein the resilient member has one end seated on a first insulating sleeve and a second end seated on a second insulating sleeve.

8. A coupling including female and male couplers configured to be connected together,
   the female coupler including:
   a female coupler valve body having axially inner and axially outer ends and an axially extending cavity extending therebetween;
   a detent carrier surrounding the female coupler valve body and having at least one detent opening extending through a wall of the detent carrier, the detent carrier being axially movable relative to the female coupler valve body by externally applied loads acting to cause the male and female couplers to separate;
   a release sleeve surrounding the detent carrier at the at least one detent opening and being movable between first and second positions relative to the detent carrier;
   at least one detent received in the at least one detent opening, each detent being held in a lock position by the release sleeve when the release sleeve is in the first position and being movable radially outwardly to an unlock position when the release sleeve is in the second position; and
   a female coupler valve disposed in the axially extending cavity of the female coupler valve body, the female coupler valve allowing for fluid flow through the cavity when the couplers are connected together and preventing fluid flow through the cavity when the couplers are disconnected; and the male coupler including:

a male coupler valve body having an axially inner end configured to be received in the female coupler, an axially outer end, and an axially extending cavity;

a detent recess on an outer surface of the male coupler valve body or a detent sleeve surrounding the male coupler valve body into which the at least one detent of the female coupler moves radially inwardly into to connect the female and male couplers; and a male coupler valve disposed in the axially extending cavity, the male coupler valve allowing for fluid flow through the cavity when the couplers are connected together and preventing fluid flow through the cavity when the couplers are disconnected; and wherein the female coupler further includes a resilient member surrounding the female coupler valve body and being seated at a first end by a support abutting an outer surface of the female coupler valve body and at a second end by a spring retainer coupled to the detent carrier, and wherein the detent carrier and retainer are movable relative to the female coupler valve body by externally applied loads acting on the male and female couplers that are greater than a force of the resilient member to compress the resilient member.

9. The coupling according to claim 8, wherein the spring retainer is coupled to the detent carrier by a retainer abutting the spring retainer and being disposed in a groove in an inner surface of the detent carrier.

10. A coupling including female and male couplers configured to be connected together, the female coupler including:

a female coupler valve body having axially inner and axially outer ends and an axially extending cavity extending therebetween;

a detent carrier surrounding the female coupler valve body and having at least one detent opening extending through a wall of the detent carrier, the detent carrier being axially movable relative to the female coupler valve body by externally applied loads acting to cause the male and female couplers to separate;

a release sleeve surrounding the detent carrier at the at least one detent opening and being movable between first and second positions relative to the detent carrier;

at least one detent received in the at least one detent opening, each detent being held in a lock position by the release sleeve when the release sleeve is in the first position and being movable radially outwardly to an unlock position when the release sleeve is in the second position; and a female coupler valve disposed in the axially extending cavity of the female coupler valve body, the female coupler valve allowing for fluid flow through the cavity when the couplers are connected together and preventing fluid flow through the cavity when the couplers are disconnected; and the male coupler including:

a male coupler valve body having an axially inner end configured to be received in the female coupler, an axially outer end, and an axially extending cavity;

a detent recess on an outer surface of the male coupler valve body or a detent sleeve surrounding the male coupler valve body into which the at least one detent of the female coupler moves radially inwardly into to connect the female and male couplers; and a male coupler valve disposed in the axially extending cavity, the male coupler valve allowing for fluid flow through the cavity when the couplers are connected together and preventing fluid flow through the cavity when the couplers are disconnected; and wherein the female coupler further includes a detent locking ring disposed interiorly of the detent carrier at the at least one detent opening and resiliently biased in a first position for holding the at least one detent in the unlock position, wherein the detent locking ring is movable to a second position away from the at least one detent opening to allow the at least one detent to be held in the lock position, and further including a resilient member having one end seated on a ledge of the valve body that projects radially outwardly and another end seated on an end of the detent locking ring, and a retainer received in a groove in an outer surface of the valve body, wherein the detent locking ring is held interiorly of the detent carrier by the retainer.

11. A coupling including female and male couplers configured to be connected together, the female coupler including:

a female coupler valve body having axially inner and axially outer ends and an axially extending cavity extending therebetween;

a detent carrier surrounding the female coupler valve body and having at least one detent opening extending through a wall of the detent carrier, the detent carrier being axially movable relative to the female coupler valve body by externally applied loads acting to cause the male and female couplers to separate;

a release sleeve surrounding the detent carrier at the at least one detent opening and being movable between first and second positions relative to the detent carrier;

at least one detent received in the at least one detent opening, each detent being held in a lock position by the release sleeve when the release sleeve is in the first position and being movable radially outwardly to an unlock position when the release sleeve is in the second position; and a female coupler valve disposed in the axially extending cavity of the female coupler valve body, the female coupler valve allowing for fluid flow through the cavity when the couplers are connected together and preventing fluid flow through the cavity when the couplers are disconnected; and the male coupler including:

a male coupler valve body having an axially inner end configured to be received in the female coupler, an axially outer end, and an axially extending cavity;

a detent sleeve surrounding the male coupler valve body and having a detent recess on an outer surface thereof into which the at least one detent of the female coupler moves radially inwardly into to connect the female and male couplers; and a male coupler valve disposed in the axially extending cavity, the male coupler valve allowing for fluid flow through the cavity when the couplers are connected together and preventing fluid flow through the cavity when the couplers are disconnected; and wherein the male coupler further includes a valve sleeve surrounding the male coupler valve body, the valve sleeve being resiliently biased against the male coupler valve to prevent fluid flow through the cavity of the male coupler valve body, and wherein the valve sleeve is movable relative to the male coupler valve from a first position preventing fluid flow through the cavity to a second position allowing fluid flow through the cavity, wherein the valve sleeve is sealed to the male coupler valve by a seal when in the first position, and wherein the valve sleeve is sealed to the male coupler valve body by a seal.

12. The coupling according to claim 11, further including a resilient member having one end seated on a ledge of the male coupler valve body that projects radially outwardly and another end seated on a ledge of the valve sleeve that projects radially outwardly, wherein the resilient member biases the valve sleeve in the first position, wherein an end face of the valve sleeve is configured to contact an end face of the female coupler valve body during connection of the couplers to move to the second position, and wherein the detent sleeve includes a ledge that projects radially inwardly from an inner surface that abuts the ledge of the male coupler valve body, and further including a retainer received in a groove in the inner surface of the detent sleeve, wherein the ledge of the male coupler valve body is captured between the retainer and the ledge of the detent sleeve.

13. The coupling according to claim 11, wherein the male coupler further includes a sleeve protector surrounding the valve sleeve, the sleeve protector being biased in a first position where an end face of the sleeve protector surrounds an end face of the valve sleeve.

14. The coupling according to claim 13, further including a resilient member having one end seated on a ledge of the valve sleeve projecting radially outwardly and another end seated on an inner ledge the sleeve protector, wherein the resilient member biases the sleeve protector in the first position.

15. The coupling according to claim 14, wherein the end face of the sleeve protector is configured to contact the end face of the female coupler valve body during connection of the couplers to move to the second position, wherein the male coupler valve body includes a guide surrounding a stem of the male coupler valve, wherein the guide includes a hub that surrounds the stem and a plurality of circumferentially spaced legs extending radially outwardly from the hub, and wherein fluid flowing through the cavity flows around the legs, and wherein the plurality of circumferentially spaced legs are integrally formed with an inner wall of the male coupler valve body that defines the axially extending cavity.

16. The coupling according to claim 15, further including a nut secured to the stem of the male coupler valve to secure the stem to the guide.

17. A breakaway female coupler coupleable to a male coupler, the female coupler including:
 a valve body having axially inner and axially outer ends and an axially extending cavity extending therebetween;
 a detent carrier surrounding the valve body and having at least one detent opening extending through a wall of the detent carrier, the detent carrier being axially movable relative to the valve body from a connecting position to a disconnecting position by breakaway loads acting on the male and female couplers when the couplers are coupled together;
 a resilient member for biasing the detent carrier towards the connecting position; and
 a valve disposed in the axially extending cavity of the valve body, the valve being biased in a first position to prevent fluid flow through the cavity when the couplers are disconnected and movable to a second position to allow fluid flow through the cavity,
 wherein the valve body has at least one flow passage extending through a wall of the valve body through which fluid flows into a chamber axially defined between the valve body and the detent carrier for applying a fluid force on the detent carrier resisting movement of the detent carrier toward its disconnecting position.

* * * * *